Oct. 26, 1926.
C. D. PLATT
1,604,237
ELECTRIC SWITCH BOX
Filed August 3, 1925
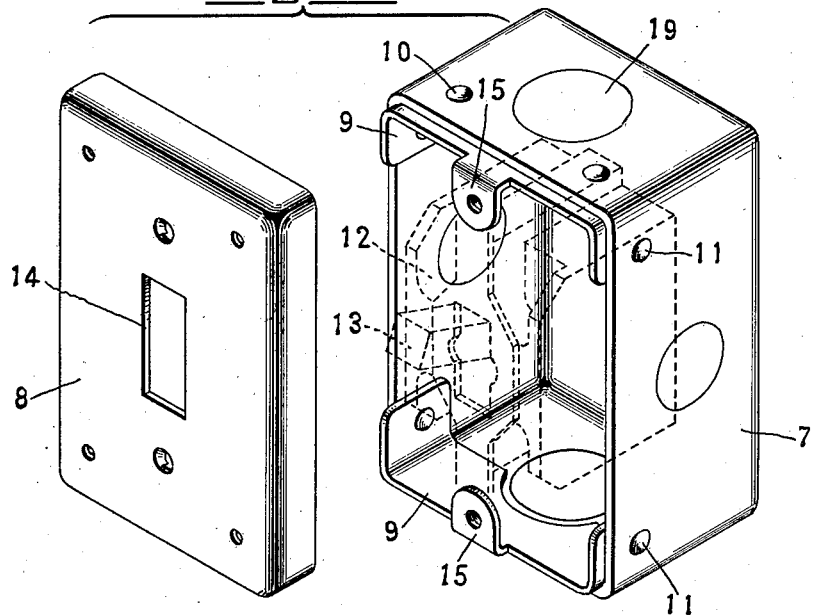
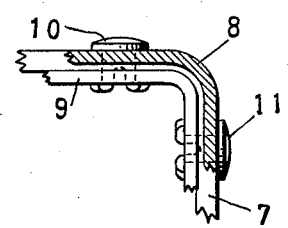
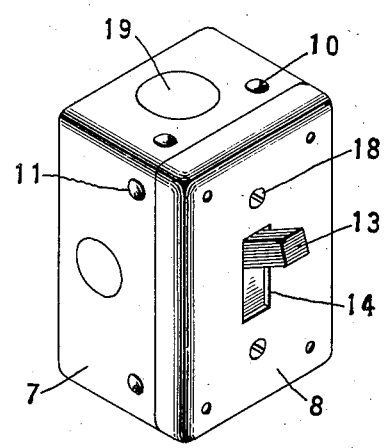
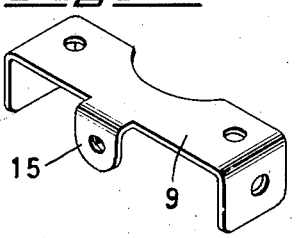
INVENTOR
*Clarence D. Platt,*
BY
ATTORNEY Patented Oct. 26, 1926.

1,604,237

UNITED STATES PATENT OFFICE.

CLARENCE D. PLATT, OF BRIDGEPORT, CONNECTICUT, ASSIGNOR TO THE TRUMBULL ELECTRIC MANUFACTURING COMPANY, OF PLAINVILLE, CONNECTICUT, A CORPORATION OF CONNECTICUT.

ELECTRIC SWITCH BOX.

Application filed August 3, 1925. Serial No. 47,660.

My invention relates to a box or receptacle particularly intended for snap switches.

The main object is to provide a box construction having a cover, the parts of which can be readily made and assembled, and in which the outer walls of the body and cover are substantially flush when the cover is in place.

These results are secured in a very simple manner by making the cover of the box of a thinner gauge of metal than the box body and providing flanges in the box to position the cover with respect to the body. In its preferred form these flanges are so constructed as to provide means for mounting the switch construction.

Fig. 1 is a perspective view of one form of construction embodying my invention for housing a so-called toggle snap switch.

Fig. 2 is a perspective view on a larger scale showing the body and the cover of the box separated and indicating in dotted lines a switch construction in the box body.

Fig. 3 is a fragmentary sectional view of one corner of the box on the plane of the line 3—3 of Fig. 4.

Fig. 4 is a fragmentary longitudinal sectional view of the box through its central plane at one end.

Fig. 5 is a perspective view of one of the flange members.

The box body 7 is preferably formed of sheet metal drawn or formed into a suitable shape. The cover 8 is also drawn up from sheet metal but of a substantially thinner gauge. The external dimensions, however, of the box body and cover are preferably the same so that when the cover is in place on the box the flanges on the cover will be substantially flush with the side and end walls of the body of the box.

Within the ends of the box I mount flange members 9 preferably each suitably held in place for instance by rivets, such as 10 and 11. Each flange 9 extends out beyond the edges of the box body and serves as positioning means for the cover. The difference in thickness of the metal of the cover and the box body allows for a considerable relative movement of the cover with respect to the body of the box. The amount of clearance is a predetermined and non-varying amount dependent upon the difference in gauge of the metal of the cover and the body of the box.

The box is particularly designed as above stated to house some form of switch, the body of which is indicated by dotted lines at 12. In this instance I have shown a toggle switch having an operating lever or handle 13 which projects through a slot 14 in the cover.

I also prefer to provide the flange members 9 with lugs 15 which serve to support the yoke 16 of the switch. This yoke may be secured in place by screws such as 17 which pass through ends of the yoke and screw into the lugs 15. The cover in turn is secured to the yoke 16 by screws 18. Thus the cover is secured to the body of the box indirectly through the yoke 16, the screws 17, and the lugs 15 of the flange members 9. Boxes of this type are frequently provided with knockouts, such as 19, so that electric conduits may be secured to the box at such points as may be desired.

This invention makes it possible to construct boxes of this character at a minimum cost and yet with great uniformity and of very attractive and finished appearance.

While it is preferable to draw up the box body from sheet metal, it is obvious that it might be formed from flat sheet metal with the corners cut out and then simply bending the side and end portions at right angles to form the box. In such a construction the flanges 9 would serve to reinforce the side and end walls of the box and provide a very substantial construction.

I claim:—

1. A sheet metal switch box body, plates secured therein and having guide flanges, and a sheet metal cover having flanges of less thickness than the box body wall, the said cover flanges being substantially flush with the outer walls of said box body, said plates being secured to and reinforcing the opposite sides and the intervening end walls of the box body and spaced away from said cover flanges to permit limited movement of the cover and screws for securing the cover to said plates.

2. A sheet metal switch box construction including a box, cover-positioning plates riveted to the opposite inner side walls of said box and having flanges projecting therefrom outside the ends of the box, a flanged sheet metal cover for said box abutting the open edges thereof, said plates having lugs and means for securing said cover to said lugs.

3. A sheet metal switch box body, brackets connecting the opposite sides of the body and extending across the ends and having flanges, a cover fitting said flanges, said brackets having inturned lugs for mounting a switch.

4. A sheet metal switch box body, sheet metal brackets secured to the opposite sides and ends thereof and having guide flanges, and a cover having a flange of less thickness than the box body wall, said guide flanges having lugs for supporting a switch.

5. A switch box having a body formed of sheet metal, a cover formed of sheet metal having flanges abutting against the outer edges of the box body, metal plates secured to opposite inner walls of the box body and having flanges projecting outside said body and forming guides spaced away from the inner walls of the cover flanges to permit lateral freedom of movement of the cover with respect to the body, said plates having lugs and screws for securing said cover to said lugs.

6. A switch box comprising a sheet metal body open at the front, metal plates secured inside said body to opposite walls thereof and projecting outside the body to form oppositely disposed guide flanges and a cover formed of sheet metal and having flanges adapted to abut against the outer edges of the body of the box, the outer surfaces of said cover flanges being substantially flush with the outer surfaces of the body of the box and the inside of the cover being sufficiently larger than the outside of said guide flanges to permit the cover to have a predetermined amount of free movement with respect to said flanges, said flanges having angular lugs, and means for securing said cover to said lugs.

CLARENCE D. PLATT.